March 12, 1957 R. R. CHAMBERS 2,785,207
PROCESS OF CHLORINATING DIISOBUTYLENE
Filed April 14, 1953
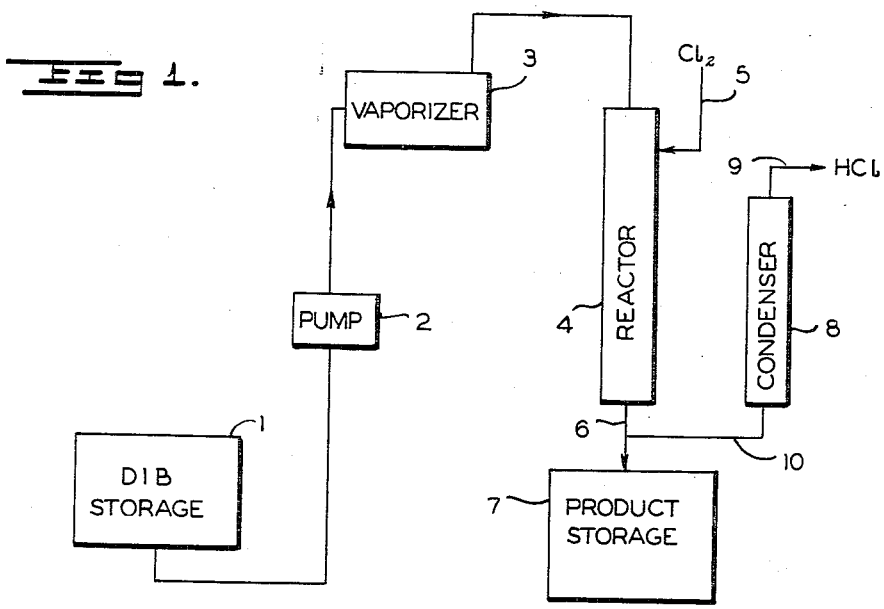
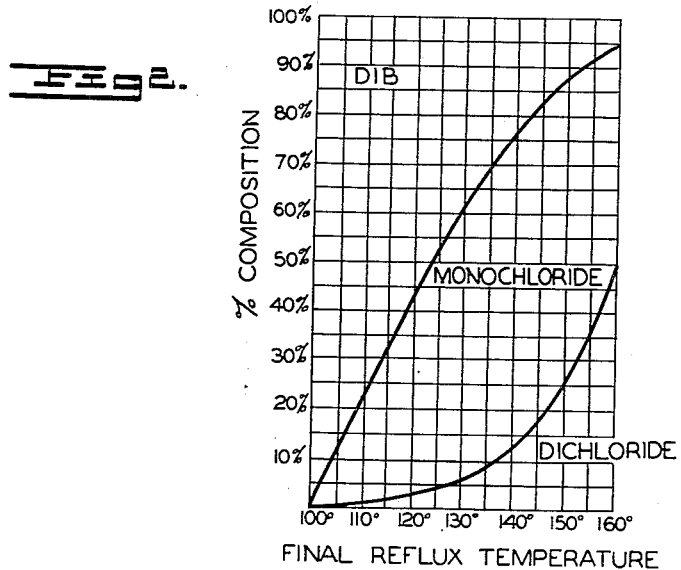
INVENTOR
ROBERT R. CHAMBERS
BY Adams, Forward and McLean
ATTORNEY United States Patent Office 2,785,207
Patented Mar. 12, 1957

2,785,207

PROCESS OF CHLORINATING DIISOBUTYLENE

Robert R. Chambers, Park Forest, Ill., assignor to Sinclair Refining Company, New York, N. Y., a corporation of Maine Application April 14, 1953, Serial No. 348,753

6 Claims. (Cl. 260—654)

This invention relates to the chlorination of diisobutylene and more specifically it is concerned with the vapor phase chlorination of diisobutylene to afford good yields of a product composed principally of unsaturated allylic monochlorides formed by substitution.

Diisobutylene may be obtained by dimerization of isobutylene under acidic conditions, e. g. by running isobutylene into sulfuric acid, and heating the resulting solution to separate diisobutylene as an oil phase.

Commonly diisobutylene is described as consisting mainly of two isomers which are 2,4,4-trimethylpentene-1 (2,4,4-TMP-1) and 2,4,4-trimethylpentene-2 (2,4,4-TMP-2). Usually about 80% of 2,4,4-TMP-1 and about 20% of 2,4,4-TMP-2 are present in commercially available diisobutylene although the amount of each isomer may be varied in the present invention until the material treated is substantially pure 2,4,4-TMP-1 or 2,4,4-TMP-2. My invention is concerned with the substitution chlorination of diisobutylene or its separate isomers in the vapor phase to give as the principal product the allylic monochlorides of diisobutylene.

It is essential in the present invention to observe certain reaction conditions if the desired yields of allylic monochlorides are to be produced. I have found that the chlorine must be added to the reaction system in a proportion substantially below the stoichiometric amount necessary to react with all the diisobutylene in the vapor phase to give the monochloride. Stated in another way, the proportion or amount of diisobutylene must be in substantial excess of that needed to react in stoichiometric proportions with the chlorine supplied to the reaction zone to yield the allylic monochlorides. During this reaction, the temperature in the reaction zone must be maintained from about 100 to 200° C. The object of both control features is to promote the selective formation of allylic monochlorides in attractive yields.

My crude chlorination product consists mainly of unchlorinated diisobutylene, mixed monochlorides, and dichlorides. These products may be separated by distillation into three main fractions, namely diisobutylene, diisobutylene monochlorides, and the higher chlorides of diisobutylene. The monochloride fraction may be separated by distillation but in the presence of hydrochloric acid at distillation temperatures the unsaturated chloride is apparently oxidized, producing highly colored material in the distillate. The formation of this undesirable color may be prevented by removing the hydrochloric acid from the mixture before distillation by washing it with water or by blowing it with nitrogen at a moderate or low temperature. The chlorinated products formed in my process may be used as chemical intermediates in the production of various products, for instance they may be hydrolyzed to yield alcohols as described in application Serial No. 347,222, filed April 7, 1953.

Structures of the three unsaturated monochloride isomers which result from the present chlorination of diisobutylene are as follows:

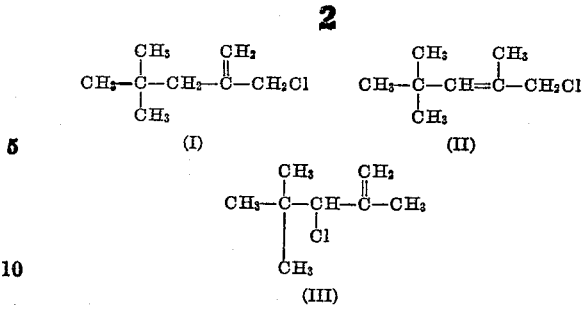

The unsaturated monochloride fraction obtained by my chlorination of diisobutylene contains at least two of the above three isomers. The presence of the two types of chlorides is indicated by the break in the hydrolysis curve of the chlorinated product as disclosed in the application mentioned above. In this application the chloride which hydrolyses rapidly in an aqueous medium is assigned the secondary chloride structure (III).

By-products which might be obtained in chlorination of diisobutylene include the saturated tertiary monochloride formed by the addition of hydrogen chloride to diisobutylene, the saturated dichloride produced by the addition of chlorine to diisobutylene, the unsaturated dichloride resulting from di-substitution of diisobutylene, and the vinyl-type chlorides. Smaller amounts of higher chlorinated products may also be produced. These by-products are all less desirable than the allylic monochlorides because they are less reactive in substitution reactions or are difunctional. My chlorination process gives unexpectedly small amounts of these potential by-products.

Identification of the individual unsaturated monochlorides resulting from the present chlorination is complicated by the great facility with which rearrangement occurs during the reaction to form derivatives. The chlorides themselves are quite stable and do not rearrange in the absence of a catalyst. It has also been found that the monochloride isomers are difficult to separate by fractional distillation. For instance, two distillations were made at reflux ratios of 50:1 and 75:1 in a glass helices packed column of about fifteen plates and the failure of fractionation was shown by the constant refractive index throughout the distillation. The constant refractive index was unusual since the original mixture contained about equal amounts of primary and secondary chlorides having different indices and some indication of separation by change of refractive index was expected even if the pure isomers were not obtained.

Since the unsaturated monochloride isomers have not been separated, samples of the two pure olefins occurring in diisobutylene were chlorinated to provide some idea regarding the properties of the chlorides in the mixture. Pure 2,4,4-TMP-2 gave almost entirely the rapidly hydrolysing secondary monochloride, while the 2,4,4-TMP-1 gave only a small amount of this chloride as is noted in the above identified application. The properties of the chlorides obtained from the pure isomers and from the reaction mixture of the present invention are shown in the table below.

TABLE I

Properties of chlorides

|  | From 2,4,4-TMP-1 | From 2,4,4-TMP-2 | From DIB |
|---|---|---|---|
| B. P. | 155.5–157.5 | 151–155.5 | 151–158 |
| $n_D^{20}$ | 1.4463 | 1.4505 | 1.4471–1.4478 |
| Sp. Gr. 60/60 | 0.8965 | 0.9095 | 0.9060–0.9064 |

Infrared analysis of 2,4,4-TMP-2 chloride shows a terminal double bond and C—Cl absorption bands at 14.6μ and 17.65μ. The spectrum of 2,4,4-TMP-1 chloride shows both internal and terminal double bonds, and the peaks at 14.6μ and 17.65μ for this chloride were small but a strong C—Cl absorption band appears at about 15.3μ. By measuring the integrated intensity of the 14.6μ or 17.65μ peak the amount of rapidly hydrolysing chloride can be determined. Measurement at 17.65μ is more reliable. Since it is seen from the infrared spectra that the 14.6μ and 17.65μ peaks and the terminal double bond are associated with the rapidly hydrolysing chloride, the structure of this chloride must be either (I) or (III) above. The position of the C—Cl peak indicates that the chloride is secondary so the structure of the rapidly hydrolysing chloride is then given by Formula III. This assignment fits in with the observed boiling points as the secondary chloride has the lower boiling point as expected (see Table I above). Accordingly, when the diisobutylene feed chlorinated is rich in 2,4,4-TMP-1 which is usually the case, the product will be rich in the chloride of Formula II in column 2 which is the unsaturated β,γ$_A$-monochloride.

In describing the present invention reference will be made to the drawings wherein:

Figure 1 illustrates a flow sheet of a continuous vapor phase chlorination system; and Figure 2 presents a graph denoting the relative amounts of the principal components of the products from the batchwise vapor phase chlorination reaction.

The vapor phase substitution chlorination reaction of my invention may be effected by several procedures. A number of these procedures are illustrated broadly in the following descriptions.

The preferred procedure for chlorinating diisobutylene in the vapor phase utilizes a continuous chlorination system. A schematic diagram of this system is shown in Figure 1. The system provides for a reservoir or storage tank 1 for diisobutylene storage from which the diisobutylene may be withdrawn by pump 2. The diisobutylene from the pump is passed to vaporizer 3 and then to a heated tube reactor 4. A stream of chlorine is introduced into the reactor by way of line 5 where it is utilized as a chlorinating agent for the diisobutylene. The chlorinated product passes from the reactor through line 6 to product storage tank 7. The vapors generated in the reactor pass into condenser 8 where any chlorinated product contained in the vapors is condensed while the hydrogen chloride produced during the chlorination reaction passes from the condenser through vent line 9. The condensed liquid passes to the product storage tank 7 by countercurrent flow to the reaction vapors in line 10.

The temperature maintained in the reaction zone of my continuous chlorination system must be high enough to keep the diisobutylene feed in the vapor phase, e. g. above 100° C. at atmospheric pressure, and low enough to avoid carbonization in the reaction zone and undue formation of products other than the desired allylic monochlorides, e. g. not over about 200° C. The preferred reaction zone temperature is about 120 to 150° C.

Unreacted diisobutylene may be separated by distillation from the chlorinated mixture obtained in the continuous chlorination process. The recovered diisobutylene may be recycled back to the chlorination reaction zone. This recycled diisobutylene will be poor in 2,4,4-TMP-2 and will contain some monochloride. Because of the monochloride present in the recycled feed, dichloride formation is higher on recycled runs. For instance, in one procedure I found that the original yield of monochloride was 96%, the first recycle gave 92% yield of monochloride, and the second recycle resulted in 86% monochloride.

In a second procedure which utilizes a batchwise chlorination system, liquid diisobutylene in a suitable container may be vaporized and passed to a reflux zone where chlorine is introduced by way of a line entering this zone. In this procedure the amount of chlorination may be followed by the rise in the reflux temperature of the liquid phase.

In a modification of the second procedure, the liquid diisobutylene may be distilled through a fractionating column before contacting the chlorine. After chlorination the partially chlorinated material is returned to the container either through the fractionating column or by a separate line.

The degree of conversion in the chlorination process of this invention may be regulated by varying the feed rates of diisobutylene and chlorine. However, as stated previously, the proportion of chlorine supplied to the reaction must be below the stoichiometric amount necessary to react with the diisobutylene to give the monochlorides. If the chlorination reaction at the chlorine inlet is not controlled, difficulty in the chlorination due to carbonization will be experienced. This carbonization may be corrected by limiting the conversion of the diisobutylene feed to not more than about 50%. Carbonization may be better controlled by dilution of the chlorine with a gas such as nitrogen while, preferably, limiting the conversion of the feed to not more than about 80%. Advantageously, carbonization may be avoided by using a diluent gas to chlorine ratio of at least 1:1 and preferably from 1.5:1 to 8:1 by volume.

The particular gaseous diluent utilized may be inert, i. e. not unduly deleterious to yields under the conditions of the reaction, and these gases include, for example, nitrogen and air. The choice of a particular diluent gas will usually depend upon cost, availability, and ease in handling, but, of course, a gas which destroys or materially reduces yields of the selective reaction should be avoided.

In my vapor phase chlorination reaction the composition of the product obtained will vary with reaction conditions observed. This composition is dependent upon the amount of dichloride formed during my reaction. The dichloride is an unsaturated compound, and no evidence of addition of chlorine to the double bond has been noted. Since my process is particularly concerned with producing high yields of unsaturated monochlorides of diisobutylene, large amounts of dichloride, of course, are undesirable.

Dichloride production in the present process is dependent upon the degree of conversion in the chlorination reaction, and the amount of dichloride formed increases at higher conversions. In order to obtain better yields of monochloride the percent conversion of the diisobutylene feed should not rise above about 50 percent if the chlorine is not diluted with a gas. Figure 2 is a graphical representation of the amount of diisobutylene, monochloride and dichloride in my vapor phase batchwise chlorination reaction. In this graph, percent composition of the product is plotted against final reflux temperature, that is, the temperature of the refluxing liquid at the end of the reaction. This temperature is a measure of the conversion. From this graph, it is apparent that the dichloride is formed by substitution of the monochloride rather than by direct addition of chlorine to the olefin. If dichloride formation were independent of the monochloride formation, the dichloride curve should be similar in shape to the monochloride curve. Further, the dichloride has been shown to be unsaturated by its infrared spectrum.

In the continuous chlorination system utilizing a hot tube reaction zone, both the chlorine and the diisobutylene feed rates may be controlled. In this system, consistently high yields of monochloride were obtained, and the amount of dichloride in the product increased as the level of conversion increased.

I have found that dilution of the chlorine with an inert gas, e. g. nitrogen, which may be used to control the rate of chlorination also decreases the dichloride formation, particularly in the continuous chlorination system operated at higher conversion levels. For instance, when utilizing conversion levels exceeding 50 percent which give excessive dichloride formation, dilution of the chlorine with at least an equal volume of an inert gas decreases the amount of dichloride formed to a marked degree. This finding is illustrated by the data in Table II.

TABLE II

*Dichloride formation continuous vapor phase chlorination*

| Run | Percent Conversion [1] | Mole Percent Dichloride [2] |
|---|---|---|
| 1 | 24 | 3 |
| 2 | 39 | 7 |
| 3 | 56 | 10 |
| 4 (N₂ dilution) | 77 | 5 |

[1] Based on chlorine.
[2] Based on total chlorinated product.

The data of Table III illustrate the tendency to produce higher proportions of dichloride at higher rates of conversion in batchwise vapor phase chlorination of diisobutylene. In Run 8, where the chlorination rate was higher than that preferred when chlorine dilution is not utilized, the product contained a very high proportion of dichloride. This chlorination rate was too high to allow for the removal of the monochloride from the reaction zone.

TABLE III

*Batchwise vapor phase chlorination to reflux temperature 135°*

| Run | Chlorination Rate, Moles Cl₂/hr. | Percent Conversion [1] | Mole Percent Dichloride [2] |
|---|---|---|---|
| 5 | .79 | 78 | 1 |
| 6 | 1.10 | 71 | 6 |
| 7 | 1.30 | 73 | 19 |
| 8 | 1.80 | 71 | 53 |

[1] Based on diisobutylene feed.
[2] Based on total chlorinated product.

The various runs listed in the above tables were effected under specified reaction conditions. The specific reaction conditions utilized are represented by the following descriptions which should be considered as illustrative and not limiting.

In the continuous vapor phase chlorination system, the reactor consisted essentially of a heated glass tube. Diisobutylene was pumped into a flask maintained at a temperature well above the boiling point of diisobutylene (for instance 140–180° C.). The diisobutylene vapors entered the glass tube maintained in a vertical position and were contacted with chlorine which was being passed into the tube. The glass tube was 15 inches long and ⅞ inch in diameter with the upper ⅘ heated by an electrical heating jacket. The lower end of the tube was connected by a Y tube to a condenser and an outlet drain for the chlorinated mixture. The feed rates of both diisobutylene and chlorine were measured and regulated. The heating jacket temperature was varied in different runs from 100–180° C. but was generally kept at about 120° C. Temperatures in the reaction zone were measured by a thermocouple and ranged from 120–170° C. depending on the proportions of chlorine and diisobutylene used in the run. The highest temperature in the reaction tube was found at the chlorine inlet. The temperature fell off rather rapidly both above and below the chlorine inlet.

When nitrogen dilution was used the nitrogen was added to the chlorine line by means of a T tube. The reaction temperatures with nitrogen dilution were lower and less localized. The highest temperature was not at the chlorine inlet but lower in the reaction tube and the region of reaction was larger as indicated by the larger area of elevated temperature.

In Run 4, Table II, which was effected according to the above specific procedure, diisobutylene was supplied to the reaction tube at a rate of 0.908 mole per hour and 0.7 mole of chlorine diluted with nitrogen were added each hour. The reaction temperature was 130 to 133° C. and the reaction continued for 3.8 hours. Calculated conversion based on chlorine was 77% and the yield of monochloride was 95% based on the total chlorinated product and 59% based on the diisobutylene feed. The molar ratio of unreacted diisobutylene to monochloride to dichloride in the product was 30:67:3.

In the batchwise chlorination reactions, diisobutylene was heated to reflux in a round-bottomed flask fitted with a condenser and thermowell. Chlorine was then introduced by a glass tube extending down the condenser to a point just above the lower end of the cooling jacket. The hydrogen chloride formed escaped from the top of the condenser during the chlorination. The temperature in the flask rose as chlorination proceeded, giving an indication of the extent of chlorination. Final temperatures ranged from 121.5 to 160° C. but were usually 135–140° C.

In Run 5, Table III, which was effected according to the above specific procedure, the diisobutylene feed was 2000 grams and the maximum reflux temperature was 135° C. The reaction continued for 14.75 hours and chlorine was supplied to the reaction zone at the rate of 0.79 mole per hour. The yield of monochloride based on the total chlorinated product was about 100%, and was 66% based on the diisobutylene feed.

As a modification of the batchwise apparatus above, a 10-inch glass helices packed column was inserted between the flask and the condenser. The purpose of the column was to fractionate out the chlorinated material before contacting with chlorine. The chlorinated product was returned to the flask through the column. In a further modification, the chlorinated product was returned to the flask by a separate line rather than through the column.

I claim:

1. The process of chlorinating diisobutylene in which the predominant isomer is 2,4,4-trimethylpentene-1 to yield a product rich in the $\beta,\gamma$-unsaturated monochloride which comprises reacting diisobutylene in the vapor phase with chlorine in a reaction zone maintained at a temperature between about 100 to 200° C. wherein the proportion of diisobutylene is in substantial excess of that needed to react in stoichiometric proportions with the chlorine in the reaction zone to yield the monochlorides.

2. The process of chlorinating diisobutylene in which the predominant isomer is 2,4,4-trimethylpentene-1 to yield a product rich in the $\beta,\gamma$-unsaturated monochloride which comprises reacting diisobutylene in the vapor phase with chlorine in a reaction zone maintained at a temperature between about 100 to 200° C. wherein the chlorine is diluted with at least an equal volume of a gas which is essentially inert under the reaction conditions and wherein the proportion of diisobutylene is in substantial excess of that needed to react in stoichiometric proportions with the chlorine in the reaction zone to yield the monochlorides.

3. The process of chlorinating diisobutylene in which the predominant isomer is 2,4,4-trimethylpentene-1 to yield a product rich in the $\beta,\gamma$-unsaturated monochloride which comprises reacting diisobutylene in the vapor phase with chlorine in a reaction zone maintained at a temperature between about 100 to 200° C. wherein the chlorine is diluted with at least an equal volume of a gas which is essentially inert under the reaction conditions and wherein the proportion of diisobutylene is in substantial excess of that needed to react in stoichiometric proportions with the chlorine in the reaction zone to yield the monochlorides.

4. The process of chlorinating diisobutylene in which the predominant isomer is 2,4,4-trimethylpentene-1 to yield a product rich in the $\beta,\gamma$-unsaturated monochloride which comprises reacting diisobutylene in the vapor phase with chlorine in a reaction zone maintained at a temperature between about 100 to 200° C. wherein the proportion of diisobutylene is in substantial excess of that needed to react in stoichiometric proportions with the chlorine in the reaction zone to yield the monochlorides and limiting the percent conversion of the diisobutylene feed to not more than about 50 percent.

5. The process of chlorinating diisobutylene in which the predominant isomer is 2,4,4-trimethylpentene-1 to yield a product rich in the $\beta,\gamma$-unsaturated monochloride which comprises reacting diisobutylene in the vapor phase with chlorine in a reaction zone maintained at a temperature between about 100 to 200° C. where the chlorine is diluted with at least an equal volume of gas which is essentially inert under the reaction conditions and wherein the proportion of diisobutylene is in substantial excess of that needed to react in stoichiometric proportions with the chlorine in the reaction zone to yield the monochlorides, and carrying the chlorination reaction to more than 50 percent conversion of the diisobutylene feed.

6. A continuous process for chlorinating diisobutylene in which the predominant isomer is 2,4,4-trimethylpentene-1 to yield a product rich in the $\beta,\gamma$-unsaturated monochloride which comprises continuously passing diisobutylene in the vapor phase to a reaction zone maintained at a temperature between about 100 to 200° C., continuously passing to the reaction zone chlorine diluted with at least an equal volume of gas which is essentially inert under the reaction conditions while maintaining the proportion of diisobutylene in the reaction zone in substantial excess of that needed to react in stoichiometric proportions with the chlorine to yield the monochlorides, carrying the chlorination reaction to more than 50 percent conversion of the diisobutylene feed, and continuously removing the monochlorides formed from the reaction zone.

References Cited in the file of this patent
UNITED STATES PATENTS 2,667,508     Towle et al. _____ Jan. 26, 1954